(12) United States Patent
Noureddine et al.

(10) Patent No.: US 10,565,112 B2
(45) Date of Patent: Feb. 18, 2020

(54) RELAY CONSISTENT MEMORY MANAGEMENT IN A MULTIPLE PROCESSOR SYSTEM

(71) Applicant: Fungible, Inc., Santa Clara, CA (US)

(72) Inventors: Wael Noureddine, Santa Clara, CA (US); Jean-Marc Frailong, Los Altos Hills, CA (US); Pradeep Sindhu, Los Altos Hills, CA (US); Bertrand Serlet, Palo Alto, CA (US)

(73) Assignee: Fungible, Inc., Santa Clara, CA (US)

( * ) Notice: Subject to any disclaimer, the term of this patent is extended or adjusted under 35 U.S.C. 154(b) by 16 days.

(21) Appl. No.: 15/949,892

(22) Filed: Apr. 10, 2018

(65) Prior Publication Data

US 2018/0293168 A1  Oct. 11, 2018

Related U.S. Application Data

(60) Provisional application No. 62/483,844, filed on Apr. 10, 2017, provisional application No. 62/625,518, filed on Feb. 2, 2018.

(51) Int. Cl.
*G06F 12/0815* (2016.01)
*G06F 12/0804* (2016.01)
*G06F 15/173* (2006.01)

(52) U.S. Cl.
CPC ...... *G06F 12/0815* (2013.01); *G06F 12/0804* (2013.01); *G06F 15/17325* (2013.01); *G06F 2212/1016* (2013.01); *G06F 2212/1032* (2013.01)

(58) Field of Classification Search
CPC ...... G06F 9/5038; G06F 9/467; G06F 9/3842; G06F 9/3851; G06F 12/0804; G06F 12/0815; G06F 2212/1032; G06F 9/5066; G06F 15/17325; G06F 2212/1016

See application file for complete search history.

(56) References Cited

U.S. PATENT DOCUMENTS

| | | | |
|---|---|---|---|
| 5,828,860 A | 10/1998 | Miyaoku et al. | |
| 6,021,473 A | 2/2000 | Davis et al. | |
| 6,314,491 B1 | 11/2001 | Freerksen et al. | |

(Continued)

FOREIGN PATENT DOCUMENTS

WO  2014178854 A1  11/2014

OTHER PUBLICATIONS

U.S. Appl. No. 15/939,227, filed by Pradeep Sindhu et al., filed Mar. 28, 2018.

(Continued)

*Primary Examiner* — Zhuo H Li
(74) *Attorney, Agent, or Firm* — Shumaker & Sieffert, P.A.

(57) ABSTRACT

Methods and apparatus for memory management are described. In a disclosed embodiment, a system has a first and a second processor, with each processor able to access a memory system. A first work unit is received for execution by the first processor, with the memory system being accessed. A second work unit is generated for execution by a second processor upon execution of a first work unit. Only after the memory system is updated does processing of the second work unit by the second processor occur. This work unit message based ordering provides relay consistency for memory operations of multiple processors.

27 Claims, 5 Drawing Sheets

(56) References Cited

U.S. PATENT DOCUMENTS

| | | |
|---|---|---|
| 6,901,451 B1 | 5/2005 | Miyoshi |
| 6,901,500 B1 | 5/2005 | Hussain |
| 6,993,630 B1 | 1/2006 | Williams et al. |
| 7,035,914 B1 | 4/2006 | Payne et al. |
| 7,486,678 B1 | 2/2009 | Devanagondi et al. |
| 7,822,731 B1 | 10/2010 | Yu et al. |
| 8,560,757 B2 | 10/2013 | Pangborn et al. |
| 8,850,101 B2 | 9/2014 | Pangborn et al. |
| 8,850,125 B2 | 9/2014 | Pangborn et al. |
| 8,966,152 B2 | 2/2015 | Bouchard et al. |
| 9,065,860 B2 | 6/2015 | Pangborn et al. |
| 9,569,366 B2 | 2/2017 | Pangborn et al. |
| 9,632,936 B1 | 4/2017 | Zuckerman et al. |
| 9,946,671 B1 | 4/2018 | Tawri et al. |
| 2003/0043798 A1 | 3/2003 | Pugel |
| 2005/0166086 A1 | 7/2005 | Watanabe |
| 2006/0112226 A1* | 5/2006 | Hady ............... G06F 15/167 711/130 |
| 2008/0244231 A1 | 10/2008 | Kunze et al. |
| 2010/0318725 A1 | 12/2010 | Kwon |
| 2011/0113184 A1 | 5/2011 | Chu |
| 2011/0173392 A1 | 7/2011 | Gara et al. |
| 2011/0238923 A1 | 9/2011 | Hooker et al. |
| 2012/0030431 A1 | 2/2012 | Anderson et al. |
| 2012/0314710 A1 | 12/2012 | Shikano |
| 2013/0028083 A1 | 1/2013 | Yoshida et al. |
| 2014/0044128 A1 | 2/2014 | Suresh et al. |
| 2014/0187317 A1 | 7/2014 | Kohler et al. |
| 2015/0143045 A1 | 5/2015 | Han et al. |
| 2015/0325272 A1 | 11/2015 | Murphy |
| 2016/0092362 A1* | 3/2016 | Barron ............... G06F 12/0835 710/308 |
| 2016/0364333 A1* | 12/2016 | Brown ............... G06F 12/0804 |
| 2016/0364334 A1 | 12/2016 | Asaro et al. |
| 2017/0235581 A1 | 8/2017 | Nickolls et al. |
| 2019/0095333 A1 | 3/2019 | Heirman et al. |

OTHER PUBLICATIONS

U.S. Appl. No. 62/530,691, filed by Pradeep Sindhu et al., filed Jul. 10, 2017.

U.S. Appl. No. 62/559,021, filed by Pradeep Sindhu et al., filed Sep. 15, 2017.

U.S. Appl. No. 62/589,427, filed by Charles Edward Gray et al., filed Nov. 21, 2017.

U.S. Appl. No. 15/949,692, filed by Wael Noureddine et al., filed Apr. 10, 2018.

Second Written Opinion of International Application No. PCT/US2018/026873, dated Mar. 15, 2019, 13 pp.

Office Action from U.S. Appl. No. 15/949,692, dated May 23, 2019, 19 pp.

Response to Second Written Opinion dated Mar. 15, 2019, from International Application No. PCT/US2018/026873, dated May 15, 2019, 6 pp.

International Search Report and Written Opinion of International Application No. PCT/US2018/026873, dated Jun. 27, 2018, 17 pp.

Response to Written Opinion dated Jun. 27, 2018, from International Application No. PCT/US2018/026873, dated Feb. 8, 2019, 18 pp.

Hurson, "Advances in Computers," vol. 92, Jan. 13, 2014, Academic Press, XP055510879, 94-95 pp.

Notice of Allowance issued in U.S. Appl. No. 15/949,692 dated Sep. 6, 2019, 13 pp.

Response to Non-final office action filed in U.S. Appl. No. 15/949,692 dated Aug. 23, 2019, 10 pp.

International Preliminary Report on Patentability from International Application No. PCT/US2018/026873, dated Jul. 18, 2019, 28 pp.

* cited by examiner

RELAY CONSISTENT MEMORY MANAGEMENT IN A MULTIPLE PROCESSOR SYSTEM

CROSS REFERENCE

This application claims the benefit of U.S. Provisional Patent Application No. 62/483,844 filed on Apr. 10, 2017, and U.S. Provisional Patent Application No. 62/625,518 filed on Feb. 2, 2018, the entire content of each of which is incorporated herein by reference in its entirety.

TECHNICAL FIELD

This disclosure relates to multi-processor systems for processing packets of information, for example, in the fields of networking and storage

BACKGROUND

Network devices, e.g., firewalls, switches, routers, storage/compute servers or other network attached devices often utilize multiple core processor systems or multiple-processing unit systems to achieve increased performance. However, processing streams of data, such as network packets, with systems having multiple processing units can present many programming challenges. For example, it is often difficult to move processing of a packet or set of packets from one processing unit to another, such as for load balancing across the processing units. Transitioning program execution from one processing unit to another can be difficult and often requires brute force movement or mapping of state, cached data, and other memory pieces associated with the program execution. Maintaining consistency of cached data and other memory across processing units while achieving high-throughput and utilization is often extremely technically challenging. For example, when using coherent memory, significant processing overhead and delays may result from operations performed by a memory coherence protocol. When using non-coherent memory, the overhead of the coherence protocol is avoided, but some processing units might not have access to data cached by another processing unit.

For example, memory can be shared in multiprocessor or multi-core systems having two or more simultaneously operating processors, each having one or more local memory caches. However, if one processor or core changes data at a particular memory location, procedures generally exist to notify all processors or cores of the change, to invalidate the respective local memory caches or refresh the caches with the updated information. This procedure is commonly known as a memory coherence protocol, and memory operating in accordance with the protocol is known as coherent memory. Typically, supporting coherent memory requires tracking cache line state and handling associated transactions for all memory blocks that are cached within the processor or processing cores and other elements of the system.

In contrast, non-coherent memory does not provide for tracking and updating data to maintain cache coherency. Without the processing overhead and delays associated with conventional coherent memory systems, memory access and utilization can be very fast and efficient. There is a large body of applications that do not benefit from a coherent memory system, particularly ones that process data linearly (e.g., process once, therefore have accesses with poor temporal locality). These "stream" applications, such as networking and storage infrastructure workloads, are increasingly important in large scale datacenters. For such applications, using a coherent memory system tends to result in significant overhead with little benefit in return.

SUMMARY

Techniques are described in which a system having multiple processing units processes a series of work units in a processing pipeline, where some or all of the work units access or manipulate data stored in non-coherent memory. In some examples, processing units may be processing cores, and in other examples, processing units may be virtual processors, hardware threads, hardware blocks, or other sub-processing core units. As described herein, a processing unit may perform operations on data as specified by a work unit. While processing the work unit, the processing unit may cache data from non-coherent memory into a segment of a cache associated with the processing unit, and perform operations specified by the work unit using that cached data. Once the work unit has completed processing, the processing unit may initiate a cache flush for the segment (or a portion of the segment) to write the dirty cache data back to the non-coherent memory. Transfer of ownership of the non-coherent memory or a portion of the non-coherent memory may be mediated by delivery of a work unit message to another processing unit. The delivery of the work unit message may be interlocked with (gated by) the flush of the data in the relevant cache segment.

In one example, this disclosure describes a relay consistent memory management method, comprising: receiving a first work unit for execution by a first processor of a multi-processor system having the first processor and a second processor coupled to a memory system; executing the first work unit, with the memory system being accessed; generating a second work unit for execution by the second processor upon execution of the first work unit; updating the memory system; and providing relay consistency by delaying processing of the second work unit by the second processor until the memory system is updated.

In another example, this disclosure describes a data processing system, comprising: a memory system; a first processor able to access a memory system, receive a first work unit for execution, and generate a second work unit for execution by a second processor upon execution of the first work unit; a memory management system connected to the first processor and able to update the memory system, wherein execution of the second work unit by the second processor occurs after memory system update to provide relay consistency.

In another example, this disclosure describes a stream processing system, comprising: multiple processors configured to accept and stream information, including a first processor able to access a memory system, receive a first work unit for execution, and generate a second work unit for execution by a second processor upon execution of a first work unit; a memory management system connected to the first processor and able to update the memory system, wherein execution of the second work unit by the second processor occurs after memory system update to provide relay consistency.

In another example, this disclosure describes a system comprising: a multi-processor system having a first processing unit and a second processing unit; and a memory system having coherent memory and non-coherent memory accessible by both the first processing unit and the second processing unit, wherein the memory system is configured to maintain cache coherency of the first processing unit and the second processing unit for the coherent memory without maintaining cache coherency for the first processing unit and the second processing unit with respect to the non-coherent memory; wherein the first processing unit is configured to: execute a first work unit, wherein executing the first work unit includes accessing data stored in the non-coherently memory of the memory system, generate a second work unit for execution by the second processing unit, update a portion of the non-coherent memory of the memory system, and transfer ownership of the portion of the non-coherent memory of the memory system to the second processing unit upon completion of the update; and wherein the second processing unit is configured to: delay execution of the second work unit before the first processing unit transfers ownership of the portion of the non-coherent memory of the memory system, and execute, after the first processing unit transfers ownership of the portion of the non-coherent memory of the memory system, the second work unit, wherein executing the second work unit includes accessing data stored in the portion of the non-coherent memory of the memory system.

The details of one or more examples are set forth in the accompanying drawings and the description below. Other features, objects, and advantages of the disclosure will be apparent from the description and drawings, and from the claims.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
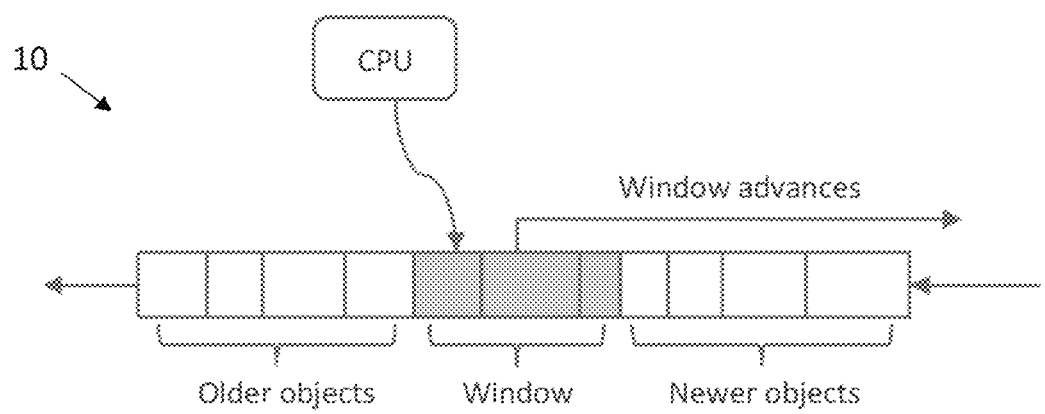
FIG. 1A is a block diagram illustrating one aspect of stream processing.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure describes a system that supports a memory model that provides for consistent ordering of memory operations at multiple memory address locations with respect to multiple processors. Since information relating to consistent memory operations is relayed between processors, this memory model and memory management system is herein referred to as "relay consistent" and is well suited for "stream" applications that process data using a succession of processors. In one embodiment, a system has a first and a second processor, with each processor able to access a memory system. A first work unit is received for execution by the first processor, with the memory system being accessed. A second work unit is generated for execution by a second processor upon execution of a first work unit. Only after the memory system is updated does processing of the second work unit by the second processor occur. This work unit message based ordering provides relay consistency for memory operations of multiple processors. As discussed in this disclosure, processors can include, but are not limited to general purpose processors, multi-core processors, individual cores, co-processors, specialized computational hardware such as cryptographic or graphical processors, virtual processers, process threads, and/or any other suitable logic component or process capable of computational tasks.

As described herein, processing of stream information may be associated with a "work unit." As one example, a Work Unit (WU) is a container that is associated with a stream state and used to describe (i.e. point to) data within a stream (stored in memory) along with any associated meta-data and operations to be performed on the data. For example, work units may dynamically originate within a peripheral unit of coupled to the multi-processor system (e.g. injected by a networking unit, a host unit, or a solid state drive interface), or within a processor itself, in association with one or more streams of data, and terminate at another peripheral unit or another processor of the one of system. The work unit is associated with an amount of work that is relevant to the entity executing the work unit for processing a respective portion of a stream.

The described system can also support coherent memory caching for certain operations. Commonly, data requiring coherent memory is often processor generated "flow data". Flow data structure benefits from coherent memory, primarily because multiple processors or cores need to access and modify the flow data. For example, information carried by a flow can include state for stateful protocols, counters to count the number of packets inspected, state for error handling protocols, and other computationally useful data.

Stream processing is a type of data processing architecture well suited for high performance and high efficiency processing. A stream is defined as an ordered, unidirectional sequence of computational objects that can be of unbounded or undetermined length. In a simple embodiment, a stream originates in a producer and terminates at a consumer, and is operated on sequentially. In some embodiments, a stream can be defined as a sequence of stream fragments; each stream fragment including a memory block contiguously addressable in physical address space, an offset into that block, and a valid length.

Streams can be discrete, such as a sequence of packets received from the network, or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

An application may operate on a stream in three broad ways: the first is protocol processing, which consists of operating on control information or headers within the stream; the second is payload processing, which involves significant accessing of the data within the stream; and third is some combination of both control and data access. A particularly important case of protocol processing is network packet processing, which must be very high performance to absorb incoming traffic at line rate. Traditional, host side data delivery can also be mapped to the stream model. For example, delivery to network interface card (NIC) buffers in host memory involve consuming a stream of packet buffers (fragments), and generating a stream of completions that consume a stream of notification buffers. Similarly, delivery to application buffers (e.g. SCSI buffers) involves consuming a stream of scatter descriptors (fragments) to place the stream of received payload.

As seen with respect to system 10 of FIG. 1A, stream processing is a specialized type of conventional general-purpose processing supporting specialized limitations with regard to both access and directionality. Processing typically only accesses a limited portion of the stream at any time, called a "window", within which it may access random addresses. In contrast, general purpose processing views the whole memory as randomly accessible at any time. Objects outside of the window are not accessible through a streaming interface. Stream processing generally progresses in one direction, called the forward direction, or from left to right in FIG. 1A. Backward movements of the window are possible, but are typically not common.

Figure 1B:
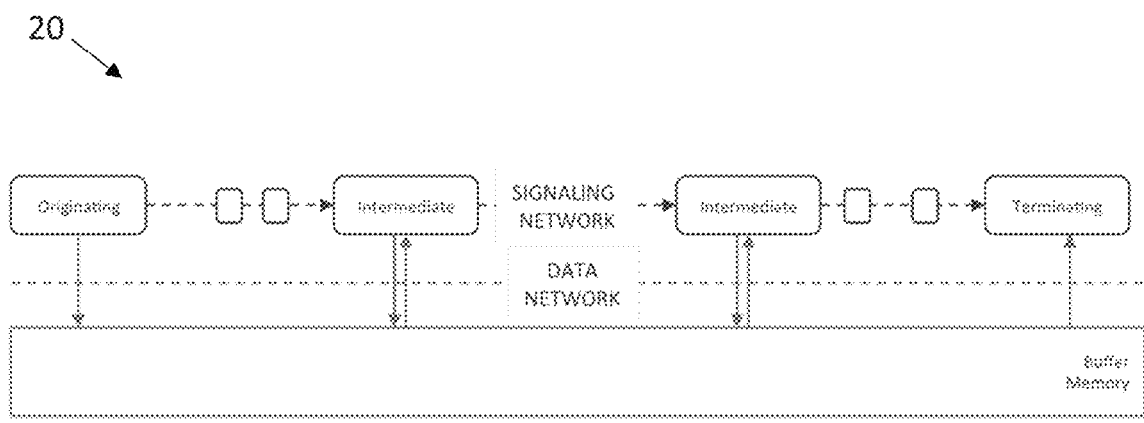
FIG. 1B is a block diagram illustrating a processing and memory system compatible with work unit processing.

In the disclosed embodiment illustrated with respect to system 20 of FIG. 1B, processing of stream information can be associated with a "work unit". As noted above, a work unit can be a container that is associated with a stream state and used to describe (i.e. point to) data within a stream (stored in memory), associated meta-data, and operations to be performed on the data. Work units originate within a peripheral unit (e.g. injected by a network unit, a host unit, or a solid state drive interface), or within a processor, and terminate at a peripheral unit or a processor. The work unit is associated with an amount of work that is relevant to the entity executing the work unit. Within a system, work units may be executed by processor cores, hardware blocks, I/O interfaces, or other computational processing units. For instance, a processor core executes a work unit by accessing memory and performing a computation. A component of a system may receive, execute or generate work units.

Stream processing can be divided into work units executed at a number of intermediate processors (or none) between source and destination. Depending on the amount of work to be performed at each stage, the number and type of intermediate processors that are involved can vary. For example, processing an encrypted stream may involve a cryptographic processor, which is not required in processing a clear text stream Transfer of ownership of a memory buffer may be mediated by a work unit message, which in some embodiments can be a small message that is delivered, using an on-chip fabric, to the processing core as a low latency notification. A pointer to a buffer can be included for processing. As an example, a work unit message may be a 4-word message. The first word may be a header, containing information necessary for message delivery, and information used for work unit execution, such as a pointer to a function for execution by a processor core. Other words may contain parameters to be passed to the function call, such as pointers to data in memory, parameter values, or contain other information used in executing the work unit. The work unit message header may specify a core that processes the work unit corresponding to a packet. The work unit message may contain a parameter that is the address of the memory where the packet is stored. Another parameter may contain information associated to the packet by the interface block. In one embodiment, receiving a work unit is signaled by receiving a message in a work unit receive queue. A work unit queue is associated with a processing element, such as a core, and is addressable in the header of the work unit message. A core can generate a work unit message by executing store instructions to addresses mapped to a work unit transmit queue. The store instructions write the contents of the message to the queue. The release of a work unit message may be interlocked with (gated by) flushing of the core's dirty cache data.

Each work unit message may be delivered (including signaling, e.g., fast interrupt) such that processing by a processor may start very quickly after a work unit message is received. The utilization of work unit messages as a way of messaging to ensure the synchronization of the non-coherent memory system is done automatically when the execution control is passed from executing one work unit message to executing another. An example of utilization of work unit messages for a smooth flow of operations in a network unit is provided below.

In one example, a network unit of a multi-core processor may receive a networking packet at first time. The network unit may allocate space in a buffer memory and may fill the allocated buffer memory space with bits from the networking packet by performing a write operation into the buffer memory. The buffer memory may send an acknowledgment to the network unit at a second time. Then, the network unit may send a first work unit message to a first processor core, to start processing of the networking packet. The first core may determine what the flow of operations may be for this particular packet, and this may take place. There may be a few read and/or write operations involved during this time frame. Then, first core may send a second work unit message to a second core, which may be the core responsible for processing packets of that flow. The processing by second core may then take place. Next, higher-level processing (e.g., deep packet inspection) may take place, and a third work unit message may be sent from a second core to a third core. Processing by third core may be completed, and subsequently, the third core may send a fourth work unit message to a host unit. There may also be a number of transactions to free up the allocated buffer memory. Communication via work unit messages may be utilized to ensure the synchronization of the non-coherent memory system is done automatically when the execution control is passed from executing one message by one core to executing another message by another core.

Advantageously, operating on streams, pipelined processors, or other synchronizable computational units using work units serves several purposes. Data movement can be minimized by exchanging and operating on pointers as much as possible. Processing efficiency is improved due to conveyance of useful meta-data, such as processing results and control state. Atomic and consistent processing of packets and associated data is enabled, as is natural pipelining and flow control by subdividing the stream into self-contained work elements that are moved at each step in relation to computational consumption rate of downstream stages.

Figure 1C:
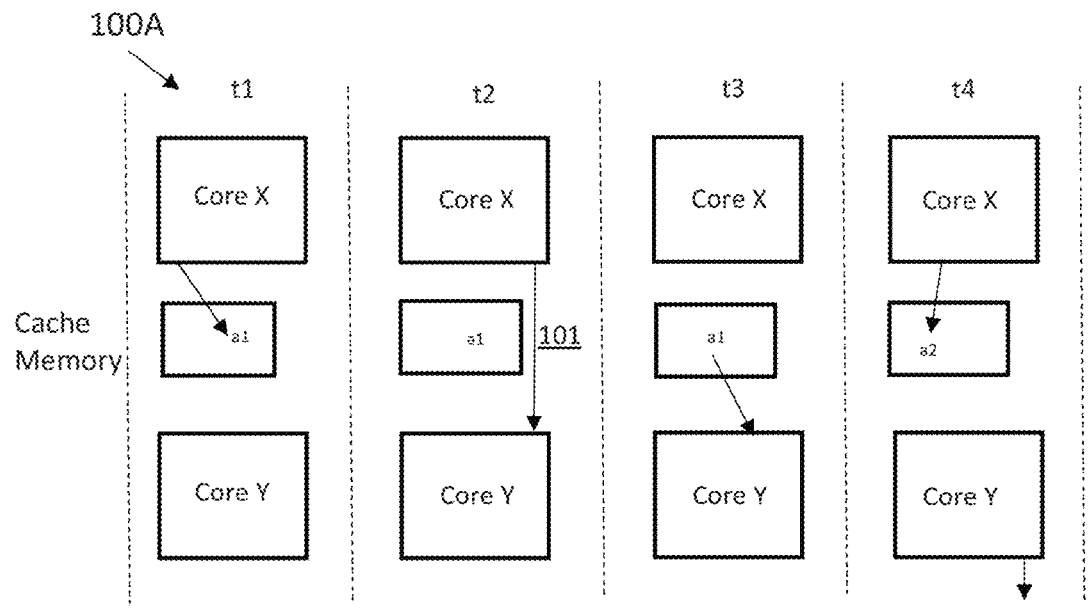
FIG. 1C is a block diagram illustrating cache memory access by multiple cores.

FIG. 1C illustrates operation of a data processing system 100A having multiple processors X and Y operating over times t1, t2, t3, t4, etc., to read and write from a memory system. Processors can include connected standalone processors, each processor on a single die, multiple processor cores on a single die, or connected arrangements of one or more standalone processors and processor cores. Execution of tasks can be passed or relayed between cores in a virtual pipeline, represented in the Figure by the arrows extending between a core X and Core Y at time t2. Consistency of data with respect to multiple memory caches in the memory system can be partially maintained by relaying messages between processors X and Y, with data at selected addresses being updated at applicable intervals. In this embodiment, a processor core X can write data to an address a1 in cache memory during a time interval t1. In time interval t2, execution of task relevant to data held at address a1 can be finished, and a message relayed to Core Y indicating validity of data at address a1 (as indicated by the arrow 101). At time interval t3, Core Y is able to process data, and is able rely on validity of data held at address a1 without updating the cache and flushing cache lines because of the earlier transmitted message 101. At time interval t4, Core X can place data at a new address a2, and Core Y can relay data and messages to another processor (not shown). Timing of cache memory updates in a system such as illustrated in FIG. 1C can be used to improve overall speed of data processing operations.

Figure 1D:
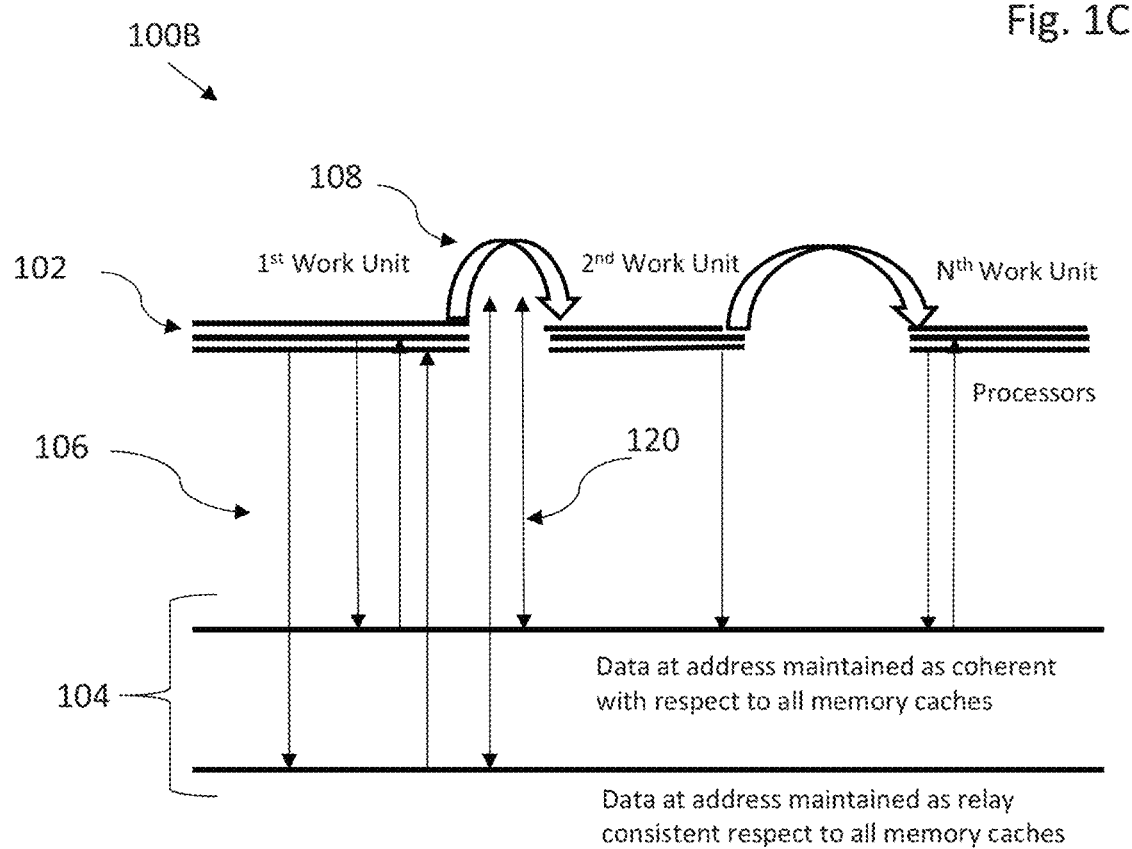
FIG. 1D is a diagram illustrating work unit processing.

FIG. 1D illustrates operation of a data processing system 100B operating (as indicated by lines 102) to read and write from a memory system (lines 14). In certain embodiments, hundreds of processors and/or processor cores can access (e.g. read or write) memory, as indicated by arrows 106. Operation of the processors is divided into discrete work units designated here as $1^{st}$ work unit, $2^{nd}$ work unit, and indefinitely extending to $N^{th}$ work unit. Each work unit typically constitutes hundreds of operations. Processor access to memory is managed (indicated by curved arrow 18) between work units to allow for cache flush interlock, cache line flushing, and updating for data requiring system wide coherency.

Figure 2:
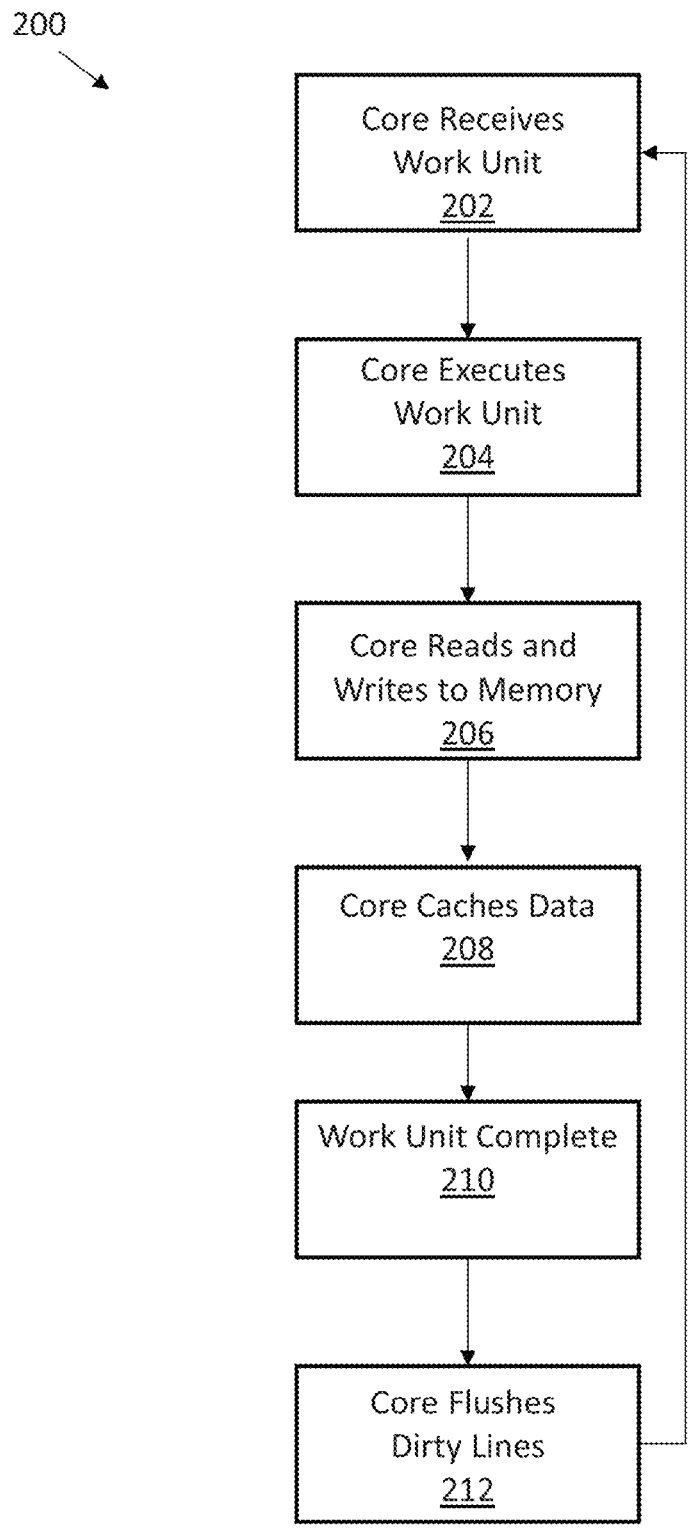
FIG. 2 is a flow chart illustrating a method for processing a work unit.
Figure 3:
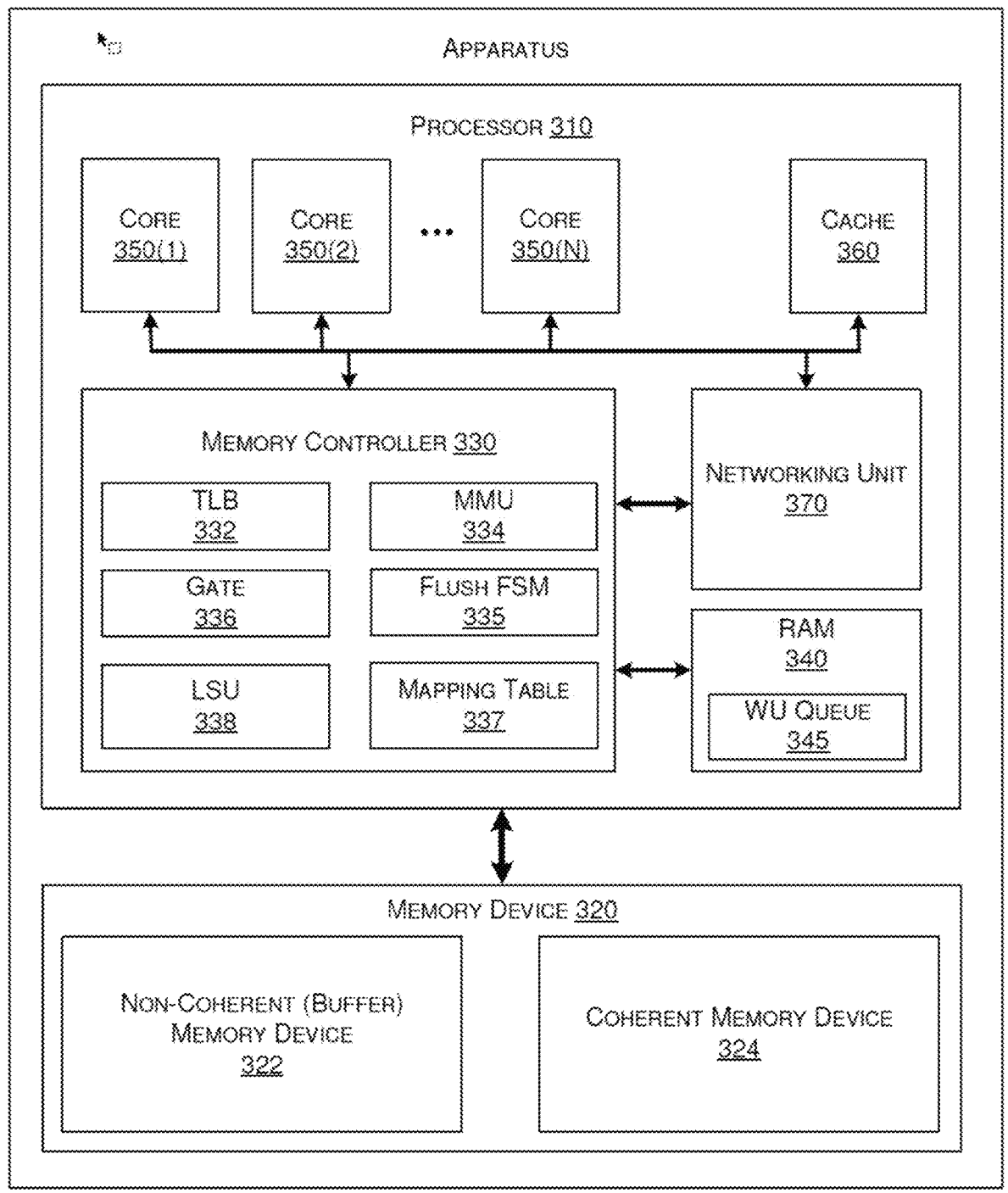
FIG. 3 is a block diagram of an example apparatus in accordance with an embodiment of the present disclosure.

FIG. 2 illustrates one embodiment of a method 200 for handling memory access. In step 202, a first core receives a first work unit. In step 204 the first core executes the first work unit, which typically requires multiple reads and writes to memory (step 206). In step 208, a local cache associated with the first core caches data. While the first work unit is executing, this cache is not operated to maintain consistency with other caches in the system. When the first work unit execution is completed (step 210), a second work unit is prepared and passed onto a second processor core along with messages indicating ownership of data at selected addresses. The first core requests the cache to flush any dirty lines (step 212) and receives a new work unit (step 202) to continue data processing operations. This cache flush interlock system effectively provides for work unit message passing to be gated by cache flushing FIG. 3 illustrates an example apparatus 300 in accordance with an embodiment of the present disclosure. In some embodiments, apparatus 300 may be an electronic apparatus or a component thereof, and the electronic apparatus may be, for example and not limited to, a smartphone, a smart wearable apparatus, a mobile or otherwise portable apparatus, an imaging apparatus, or a computing apparatus such as a tablet computer, a laptop computer, a notebook computer, a desktop computer or a server. In some embodiments, apparatus 300 may be implemented in the form of one or more IC chips such as, for example and not limited to, one or more multi-core central processing units (CPUs) or multi-core processors.

Apparatus 300 may include some or all of those components shown in FIG. 3. For instance, apparatus 300 may include a multi-core processor 310 (hereinafter interchangeably referred as "processor 310") and a memory device 320. Memory device 320 may include two types of memories or memory devices, namely: non-coherent (buffer) memory device 322 and coherent memory device 324. Processor 310 may include a plurality of cores 350(1)-350(N), with N being a positive integer greater than 1. Processor 310 may also include a memory controller 330 and a networking unit 370. Processor 310 may further include a random-access memory (RAM) 340 and a cache 360. Each component of apparatus 300 may be implemented partially or completely in hardware form. For instance, each component of apparatus 300 may include electronic circuit(s) formed by one or more transistors, one or more diodes, one or more resistors, one or more capacitors, one or more inductors, one or more varactors and/or one or more memristors.

Each of the cores 350(1)-350(N) may be configured, adapted, designed or otherwise arranged to process one or more events or activities related to a given data packet such as, for example, a networking packet or a storage packet. Networking unit 370 may be configured, adapted, designed or otherwise arranged to receive one or more data packets from and to transmit one or more data packets to one or more external devices. RAM 340 may function as a messaging interface and may include an egress work unit (WU) queue 345.

Memory controller 330 may be communicatively coupled to memory device 320 (including non-coherent memory device 322 and coherent memory device 324), cores 350(1)-350(N), networking unit 370, RAM 340 and cache 360. Memory controller 330 may control access to memory device 320 by cores 350(1)-350(N) and any number of external clients. Memory controller 330 may be configured, adapted, designed or otherwise arranged to perform a number of operations to render memory management in accordance with the present disclosure. Accordingly, referring to FIG. 3, memory controller 330 is shown to include the functional blocks of translation lookaside buffer (TLB) 332, memory management unit (334), gate 336, flush finite state machine (FSM) 335, load/store unit (LSU) 338 and mapping table 337.

In some embodiments, memory controller 330 may be capable of mapping accesses from one of the cores 350(1)-350(N) to either of non-coherent memory device 322 and coherent memory device 324. In some embodiments, in mapping the accesses, memory controller 330 may map the accesses based on one or more criteria. For instance, the criteria may include an address range, an instruction or an operation code within the instruction, a special access, or a combination thereof.

In some embodiments, memory controller 330 may be capable of mapping a virtual address to a physical address for non-coherent memory device 322 by performing a number of operations. For instance, memory controller 330 may map to a buffer memory of non-coherent memory device 322 using a TLB entry for a discrete stream of data packets. Moreover, memory controller 330 may map to a stream handle using the TLB entry for a continuous stream of data packets.

In some embodiments, memory controller 330 may be capable of flushing modified cache lines associated with a buffer memory of non-coherent memory device 322 after use by a first core of the plurality of cores 350(1)-350(N). Moreover, memory controller 330 may be capable of transferring ownership of the buffer memory to a second core of the plurality of cores 350(1)-350(N) after the flushing.

In some embodiments, memory controller 330 may be capable of transferring ownership of a segment of the plurality of segments from a first core of the plurality of cores 350(1)-350(N) to a second core of the plurality of cores 350(1)-350(N) by performing a number of operations. For instance, memory controller 330 may hold onto a message generated by the first core. Additionally, memory controller 330 may flush the segment upon the first core completing an event using the segment. Furthermore, memory controller 330 may provide the message to the second core in response to both of: (1) there being no outstanding write operations for the segment, and (2) the segment not being flushed currently.

In some embodiments, the plurality of cores 350(1)-350(N) may be capable of processing a plurality of events related to each data packet of the one or more data packets, received by networking unit 370, in a sequential manner using one or more work unit messages. In some embodiments, in processing the plurality of events related to each data packet, a first core of the plurality of cores 350(1)-350(N) may process a first event of the plurality of events. Moreover, the first core may provide to a second core of the plurality of cores 350(1)-350(N) a first work unit message of the one or more work unit messages. Furthermore, the second core may process a second event of the plurality of events in response to receiving the first work unit message from the first core.

Figure 4:
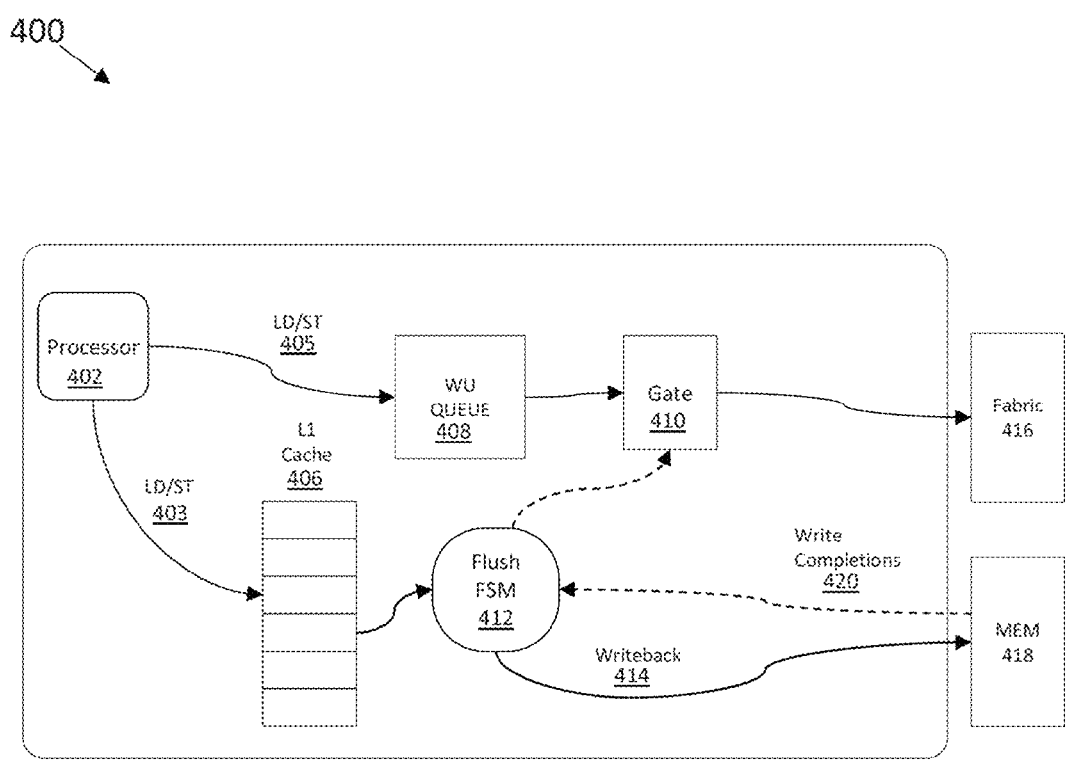
FIG. 4 is a diagram illustrating an example functional block of an embodiment.

FIG. 4 shows relevant functional blocks of a portion of a multi-processor system 400 for cache flush interlock with work unit messaging support. In this example, a processor 402 can access an L1 cache 406 or a work unit (WU) queue 408 through the load store units (LD/ST 403 and 405). The work unit queue is interlocked with a gate 410 that prevents passing of messages and data to a fabric 416 unless the Flush Finite State Machine (FSM) 412 has received indications of write completions 420 in response to earlier writebacks 414 to MEM 418. As will be appreciated, since the flush and the message go to different interfaces, proper interlocking is needed between the flush request setting the "flush in progress" indication and the message appearing at the wait station.

Further information relating to aspects of this disclosure are available in U.S. Provisional Patent Application No. 62/514,583, filed Jun. 2, 2017, entitled "Non-Blocking Any-to-Any Data Center Network with Packet Spraying Over Multiple Alternate Data Paths,", U.S. Provisional Patent Application No. 62/530,591, filed Jul. 10, 2017, entitled "Data Processing Unit for Computing Devices,", U.S. Provisional Patent Application No. 62/559,021, filed Sep. 15, 2017, entitled "Access Node for Data Centers,", U.S. Patent Application Ser. No. 62/589,427, filed Nov. 21, 2017, and U.S. Provisional Patent Application No. 62/625,518, filed Feb. 2, 2018, entitled "Efficient Work Unit Processing in a Multicore System,", the entire content of each of which is incorporated herein by reference.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A relay consistent memory management method, comprising:

receiving a first work unit message identifying first work unit operations for execution by a first processor of a multi-processor system having the first processor and a second processor coupled to a non-coherent memory system that includes a shared portion of non-coherent memory accessible to both the first processor and the second processor;

executing, by the first processor, the first work unit operations, with the shared portion of the non-coherent memory being accessed;

generating, by the first processor, a second work unit message identifying second work unit operations for execution by the second processor after execution of the first work unit operations, wherein execution of the second work unit operations involves access to the shared portion of the non-coherent memory;

updating the shared portion of the non-coherent memory included in the memory system; and providing, with a memory management system, relay consistency by transferring ownership of the shared portion of the non-coherent memory from the first processor to the second processor through delivery of the second work unit message, wherein transferring ownership includes delaying delivery of the second work unit message to the second processor until indications of write completions for the shared portion of the non-coherent memory included in the memory system have been received by the memory management system.

2. The method of claim 1, further comprising:
receiving a new work unit for execution by the first processor.

3. The method of claim 1, wherein the memory system further comprises both coherent and non-coherent memory, and wherein executing the first work unit includes:
accessing the non-coherent memory.

4. The method of claim 3, wherein the coherent and non-coherent memory have non-overlapping memory address ranges.

5. The method of claim 1, wherein the memory system further comprises a main memory and a cache memory.

6. The method of claim 5, wherein non-coherent memory in the main memory is relay consistent with respect to the first and second processors.

7. The method of claim 5, wherein updating the memory system further comprises cache flushing.

8. The method of claim 5, wherein updating the memory system further comprises use of a cache flush interlock system.

9. The method of claim 1, wherein the first processor owns the shared portion of the non-coherent memory during execution of the first work unit.

10. The method of claim 9, wherein delaying delivery of the second work unit message to the second processor comprises gating communication of the second work unit to the second processor by cache flushing.

11. The method of claim 1, wherein at least one of the first and second processors direct work units to multiple processors.

12. The method of claim 1, wherein at least one of the first and second processors receives work units from multiple processors.

13. The method of claim 1, wherein the first work unit includes processed I/O packet data.

14. A data processing system, comprising:
a memory system including a shared non-coherent memory;
a first processor configured to access a shared portion of the shared non-coherent memory included in the memory system, receive a first work unit message identifying first work unit operations for execution using the shared portion of the shared non-coherent memory, and generate a second work unit message identifying second work unit operations for execution by a second processor using the shared portion of the shared non-coherent memory upon execution of the first work unit by the first processor;
a memory management system connected to the first processor and configured able to update the memory system,
wherein the memory management system transfers ownership of the shared portion of the shared non-coherent memory through delivery of the second work unit message, and wherein transferring ownership includes delaying delivery of the second work unit message so that execution of the second work unit by the second processor occurs after the memory system updates the shared portion of the shared non-coherent memory to provide relay consistency.

15. The data processing system of claim 14, wherein the memory system further comprises coherent memory.

16. The method of claim 15, wherein the coherent and non-coherent memory have non-overlapping memory address ranges.

17. The data processing system of claim 15, wherein the memory management system is further configured to update the memory system by cache flushing.

18. The data processing system of claim 15, wherein the memory management system is further configured to update the memory system through use of a cache flush interlock system.

19. A stream processing system, comprising:
multiple processors configured to accept and stream information, including a first processor configured to access a shared portion of non-coherent memory included in a memory system, receive a first work unit message identifying first work unit operations for execution by the first processor using the shared portion of non-coherent memory, and generate a second work unit message identifying second work unit operations for execution by a second processor using the shared portion of non-coherent memory upon execution of the first work unit operations by the first processor; and
a memory management system connected to the first processor and configured to update the memory system,
wherein the memory management system transfers ownership of the shared portion of the shared non-coherent memory through delivery of the second work unit message from the first processor to the second processor, and
wherein transferring ownership includes delaying delivery of the second work unit message to the second processor so that execution of the second work unit by the second processor occurs after any memory system update in response to execution of the first work unit by the first processor to provide relay consistency for the shared portion of non-coherent memory.

20. The stream processing system of claim 19, wherein the first work unit message further comprises both a work unit message header with information for controlling message delivery, and information used for controlling work unit execution.

21. The stream processing system of claim 20, wherein the work unit message header specifies a processor to process the work unit.

22. The stream processing system of claim 20, wherein the information used for work unit execution further comprises a pointer to a function for execution by a processor.

23. The stream processing system of claim 19, wherein release of a second work unit message for execution is interlocked with flushing of dirty cache data.

24. A system comprising:
a multi-processor system having a first processing unit and a second processing unit; and a memory system having coherent memory and non-coherent memory accessible by both the first processing unit and the second processing unit, wherein the memory system is configured to maintain cache coherency of the first processing unit and the second processing unit for the coherent memory without maintaining cache coherency for the first processing unit and the second processing unit with respect to the non-coherent memory;

wherein the first processing unit is configured to:
execute first work unit operations identified by a first work unit message, wherein executing the first work unit operations includes accessing data stored in a shared portion of the non-coherent memory of the memory system,
generate a second work unit message identifying second work unit operations for execution by the second processing unit, wherein the memory system is further configured to:
update a portion of the non-coherent memory of the memory system,
transfer ownership of the shared portion of the non-coherent memory of the memory system through releasing the second work unit message to the second processing unit upon completion of the update, and
delay execution of the second work unit operations before the first processing unit transfers ownership of the shared portion of the non-coherent memory of the memory system, and
wherein the second processing unit is configured to execute, after the first processing unit transfers ownership of the shared portion of the non-coherent memory of the memory system, the second work unit operations, wherein executing the second work unit operations includes accessing data stored in the shared portion of the non-coherent memory of the memory system.

25. The system of claim 24, wherein to update the portion of the non-coherent memory of memory system, the memory system is further configured to:
write modified data stored in a cache to the non-coherent memory of the memory system.

26. The system of claim 24, wherein to transfer ownership of the memory system the memory system is further configured to perform a cache flush and output the second work unit message to the second processing unit upon completion of the update of the non-coherent memory of the memory system.

27. The system of claim 26, wherein the non-coherent memory is relay consistent with respect to the first processing unit and the second processing unit.

* * * * *